(12) United States Patent
Wheeler

(10) Patent No.: US 9,755,987 B2
(45) Date of Patent: Sep. 5, 2017

(54) VIRTUAL RESOURCE MAPPING MECHANISMS

(71) Applicant: FutureWei Technologies, Inc., Plano, TX (US)

(72) Inventor: Jeff Wheeler, Battle Mountain, NV (US)

(73) Assignee: Futurewei Technologies, Inc., Plano, TX (US)

( * ) Notice: Subject to any disclaimer, the term of this patent is extended or adjusted under 35 U.S.C. 154(b) by 212 days.

(21) Appl. No.: 14/173,503

(22) Filed: Feb. 5, 2014

(65) Prior Publication Data
US 2015/0222564 A1    Aug. 6, 2015

(51) Int. Cl.
| | | |
|---|---|---|
| G06F 15/173 | (2006.01) |
| H04L 12/911 | (2013.01) |
| G06F 9/455 | (2006.01) |
| H04L 12/24 | (2006.01) |

(52) U.S. Cl.
CPC .......... *H04L 47/70* (2013.01); *G06F 9/45533* (2013.01); *H04L 41/0896* (2013.01)

(58) Field of Classification Search
USPC ................................ 709/226, 217, 200, 203
See application file for complete search history.

(56) References Cited

U.S. PATENT DOCUMENTS

| | | | | |
|---|---|---|---|---|
| 8,972,983 B2* | 3/2015 | Li | ........................ | G06F 9/5066 |
| | | | | 370/229 |
| 2011/0119748 A1* | 5/2011 | Edwards | ............... | G06F 9/5077 |
| | | | | 726/12 |
| 2012/0060168 A1* | 3/2012 | Lee | ........................ | G06F 9/4887 |
| | | | | 718/104 |
| 2013/0332927 A1 | 12/2013 | Tang et al. | | |

FOREIGN PATENT DOCUMENTS

| | | |
|---|---|---|
| CN | 101241476 A | 8/2008 |
| WO | 2012113336 A1 | 8/2012 |

OTHER PUBLICATIONS

International Search Report and Written Opinion received in International Application No. PCT/CN2015/072241 mailed Apr. 28, 2015, 12 pages.

* cited by examiner

*Primary Examiner* — El Hadji Sall
(74) *Attorney, Agent, or Firm* — Slater Matsil, LLP

(57) ABSTRACT

A task-oriented virtual resource can be dynamically mapped to multiple physical resource types in order to better align resource allocation mechanisms. Mappings between the task-oriented virtual resource and the physical resource types may be managed in accordance with a workload associated with an underlying task being performed by the network on behalf of a user. The number of physical resource units that are mapped to the task-oriented virtual resource may be varied in accordance with one or more workload conditions using a finite state machine. The finite state machine can include nodes representing static or dynamic states for each physical resource type. The nodes may be interconnected via relationships, which can be governed by the workload conditions. Relationships between nodes may be modeled using hybrid graphs.

20 Claims, 8 Drawing Sheets

VIRTUAL RESOURCE MAPPING MECHANISMS

TECHNICAL FIELD

The present invention relates generally to managing the allocation of resources in a network, and in particular embodiments, to techniques and mechanisms for mapping task-oriented virtual resources to physical resources.

BACKGROUND

In modern network environments, physical resources can be shared amongst multiple users. For example, a local network (LAN) established in a community work environment may allow physical resources (e.g., storage, processing, printing, etc.) of one or more network devices (e.g., servers, printers, routers, etc.) to be shared amongst multiple local users. Advancements in telecommunication technology have permitted resource sharing to be extended to remotely located users, which has birthed various new service industries, e.g., cloud computing, etc.

Various resource allocation, assignment and management concepts have been employed to improve resource utilization in shared network environments. One such concept is resource virtualization, which maps many virtual resources to comparatively fewer physical resources to exploit oversubscription and increase resource utilization. In traditional virtualization environments, oversubscription is achieved by mapping multiple virtual resource units to a single physical resource unit to increase the pool of allocable resources. For instance, eight virtual processing resource units may be mapped to each physical processing resource unit to increase the amount of allocable processing resources by a factor of eight. This practice of oversubscription relies on the theory that statistically few users will attempt to fully utilize their allocated resources simultaneously. While resource virtualization and other allocation concepts have improved the effectiveness in which physical resources are shared amongst users, new and innovative strategies for achieving more equitable and efficient resource sharing are desired.

SUMMARY OF THE INVENTION

Technical advantages are generally achieved, by embodiments of this disclosure which describe mechanisms for resource identification.

In accordance with an embodiment, a method for sharing network resources is provided. In this example, the method includes creating a virtual resource corresponding to a task to be performed by the network on behalf of a customer, and mapping the virtual resource to multiple physical resources in a resource pool of the network. An apparatus for performing this method is also provided.

In accordance with another embodiment, a computer program product is provided. In this example, the computer program product includes a computer readable storage medium that storing programming. The programming includes instructions to create a virtual resource corresponding to a task to be performed by a network on behalf of a customer, and to map the virtual resource to multiple physical resources in a resource pool of the network.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
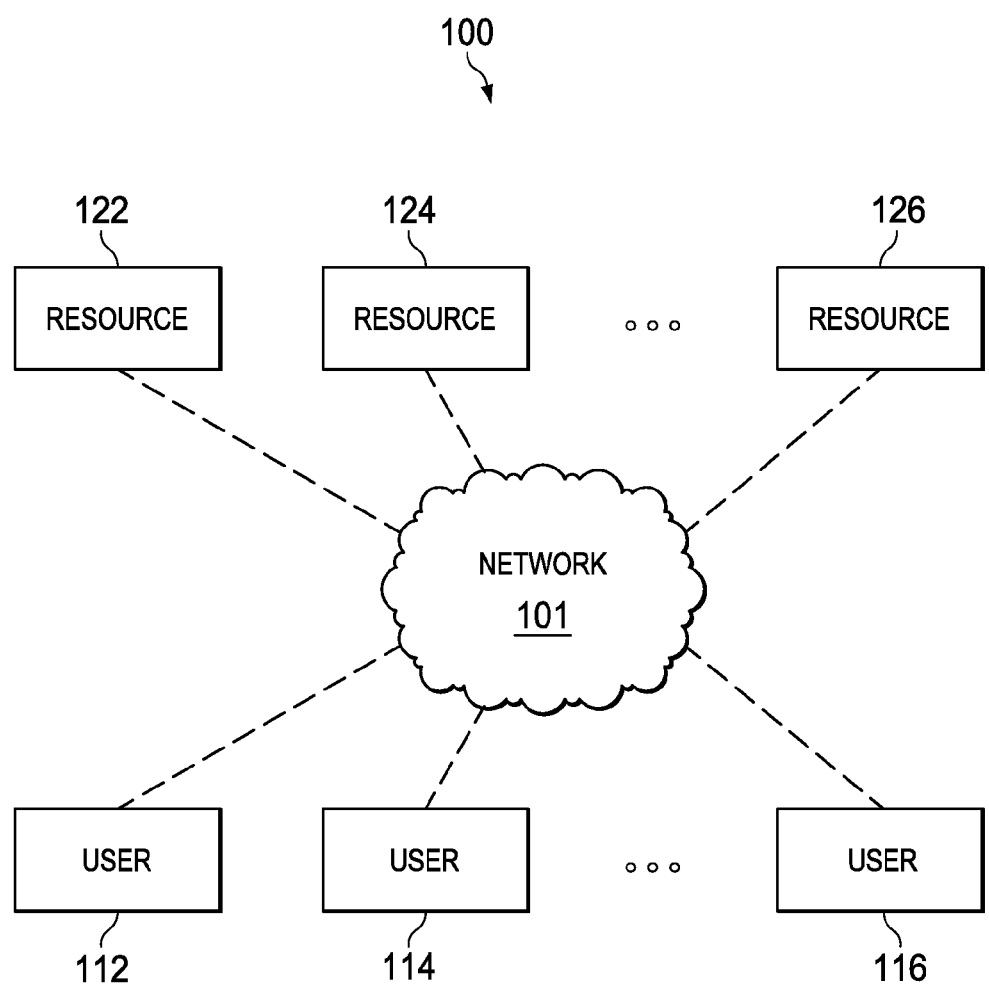
FIG. 1 illustrates a diagram of a resource sharing network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Conventional virtualization techniques create virtual resource types that mirror physical resource types. For example, a conventional virtualized network having physical processing, physical memory, and physical storage resources may also include corresponding virtual processing, virtual memory, and virtual storage resources. As such, users consume virtual resources in the same way they would physical resources. By way of example, users in virtualized networks may purchase a terabyte of virtual storage in much the same way as retail customers would purchase a terabyte of physical storage. Moreover, conventional virtualization techniques typically adjust the ratio of virtual resources to physical resources by monitoring performance criteria of network components responsible for providing the physical resources. For example, a network operator may increase the ratio of virtual processing resources to physical processing resources if it is determined that a central processing unit is being underutilized.

This conventional technique of manipulating the ratio of virtual resources to physical resources based on the performance criteria of network components may inefficiently and/or inequitably allocate shared resources because the manipulation is designed to optimize network component utilization, rather than to meet task-oriented performance metrics. More specifically, end users may not care how many resources are allocated (or available) to them so long as the available resources are sufficient to perform their task(s) in a manner that meets the users' performance metrics, e.g., quality and/or timeliness constraint. For example, consider a customer that purchases X number of virtual resources for the purpose of processing electronic sales transactions for the customer's electronic business (e-business), e.g., online store, etc. From the customer's perspective, it is likely unimportant that X number of resources are actually available upon demand. Instead, the customer's primary concern may be that the amount of available resources is sufficient to process his sales transactions in a timely manner. Hence, the customer may not notice (or care) that fewer than X number of physical resources are available upon demand so long as the number of available resources are adequate for processing the current month's sales transactions. Thus, manipulating the ratio of virtual resources to physical resources may only indirectly effect the network's ability to perform a specific task or collection of tasks, and therefore may be an inefficient and/or inequitable mechanism for allocating shared-resources in virtualized network environments.

Aspects of this disclosure provide task-oriented virtual resources in order to better align resource allocation mechanisms with the task-oriented performance metrics. More specifically, each task-oriented virtual resource is dynamically mapped to multiple physical resource types based on a workload associated with the underlying task. For example, a task-oriented virtual resource named "sales transaction processing" may be created for the e-business customer to perform the task of processing electronic sales transactions. The "sales transaction processing" virtual resource may be directly mapped to multiple physical resource types based on a workload associated with the task of processing electronic sales transactions. Additionally, the number of physical resource units that are mapped to a task-oriented virtual resource may be varied in accordance with one or more workload conditions. For instance, additional physical processing resources units may be mapped to the "sales transaction processing" virtual resource if the number of electronic sales transactions is increased. In some embodiments, the number of physical resource units mapped to a task-oriented virtual resource may be managed using a finite state machine, which may include nodes representing static or dynamic states for each physical resource type. The nodes may be connected via relationships, which may be governed by workload conditions. In some embodiments, relationships between nodes may be modeled using hybrid graphs. These and other aspects of this disclosure are described in greater detail below.

FIG. 1 illustrates a system 100 configured for resource-sharing. As shown, the system 100 includes a network 101, a plurality of users 112-116, and a plurality of physical resources 122-126. The network 101 may be any network that allows the users 112-116 to share the resources 122-126, and may include various links, components, and/or devices for doing so. The users 112, 114, 116 may be centralized in a local network or distributed across remote network locations. The resources 122-126 may include any type of physical resource, e.g., memory, processing, storage, load balancing, etc. In some embodiments, each of the resources 122, 124, 126 correspond to a different resource type. For instance, the resource 122 may be a processing resource, the resource 124 may be a memory resource, and the resource 126 may be a storage resource.

Figure 2:
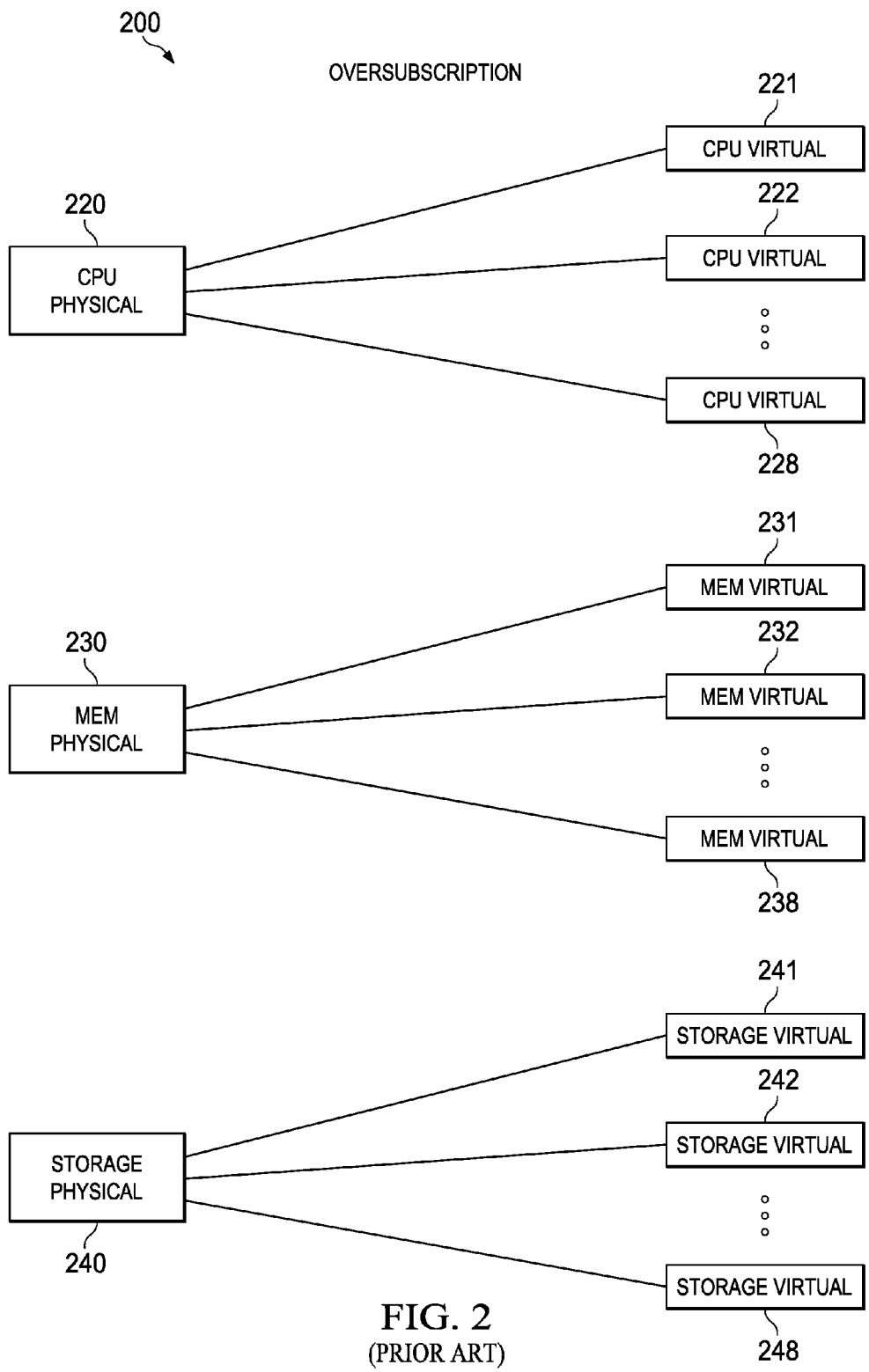
FIG. 2 illustrates a diagram of a conventional virtualization environment.

Some resource sharing networks may implement virtualization techniques in order to exploit oversubscription. FIG. 2 illustrates a conventional virtualization environment 200 for mapping virtual resources to physical resources. As shown, the conventional virtualization environment 200 includes a plurality of physical resources 220, 230, 240 and a plurality of virtual resources 221-228, 231-238, 241-248. In this example, the physical resources 220, 230, 240 include a physical central processing unit (CPU) resource 220, a physical memory resource 230, and a physical storage resource 240. The physical resources 220, 230, 240 may represent resources provided by underlying network components/devices, such as processors, servers, etc. Each of the physical resources 220, 230, 240 are mapped to corresponding virtual resources 221-228, 231-238, 241-248. More specifically, the physical CPU resource 220 is mapped to a plurality of virtual CPU resources 221, 222, . . . 228, the physical memory resource 230 is mapped to a plurality of virtual memory resources 231, 232, . . . 238, and the physical storage resource 240 is mapped to a plurality of virtual storage resources 241, 242, . . . 248. Mapping multiple virtual resources to a single physical resource is the manner in which conventional virtualization environments achieve oversubscription.

Notably, the conventional virtualization environment 200 maps virtual resource types (e.g., CPU, memory, storage, etc.) directly to corresponding physical resource types. Moreover, the conventional virtualization environment 200 varies the ratio of virtual to physical resources based on the performance of the underlying network components/devices responsible for providing the physical resources 220, 230, 240. For example, the conventional virtualization environment 200 may vary the number of virtual CPU resources 221, 222, . . . 228 mapped to the physical CPU resource 220 based on performance parameters of a processor (e.g., central processing unit (CPU), etc.) responsible for providing the physical CPU resource 220. In this example, if it is determined that the physical CPU resource 220 is under-utilized, the conventional virtualization environment 200 may map additional virtual CPU resources 221, 222, . . . 228 to the physical CPU resource 220. Alternately, it is determined that the physical CPU resource 220 is over-utilized, the conventional virtualization environment 200 may reduce the number of virtual CPU resources 221, 222, . . . 228 mapped to the physical CPU resource. As mentioned above, varying the oversubscription rate alone may be an inequitable and/or inefficient mechanism for managing the allocation of shared resources, as increasing/decreasing the over-subscription rate may not directly affect the network's ability to perform a task in a manner that meets the customer's performance requirements (e.g., timeliness constraints, etc.).

Figure 3:
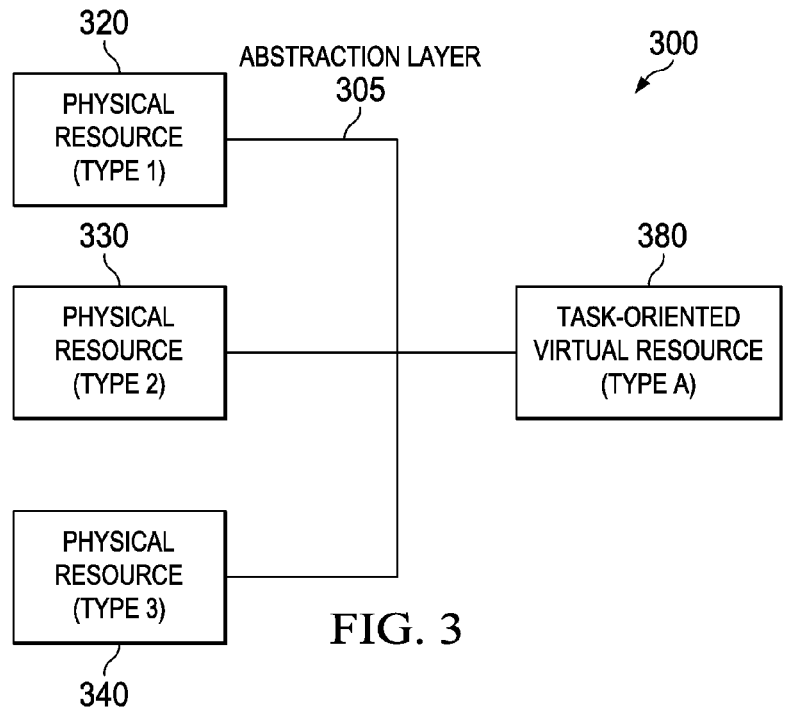
FIG. 3 illustrates a diagram of an embodiment virtualization environment.

Aspects of this disclosure provide embodiment virtualization environments in which task-oriented virtual resources are mapped to multiple physical resources using an abstraction layer. FIG. 3 illustrates an embodiment virtualization environment 300 in which a task-oriented virtual resource 380 is mapped to multiple physical resources 320, 330, 340 via an abstraction layer 305. The physical resources 320, 330, 340 may be selected from a pool of physical resources. The pool of physical resources may include a plurality of physical resource types, e.g., type 1, type 2, type 3, . . . type n (where n is an integer greater than 3). Notably, the task-oriented virtual resource 380 may have a type (e.g., type A) that is excluded from the pool of physical resources.

Thus, the task-oriented virtual resource 380 may have a virtual resource type that does not have a corresponding physical resource type.

Figure 4:
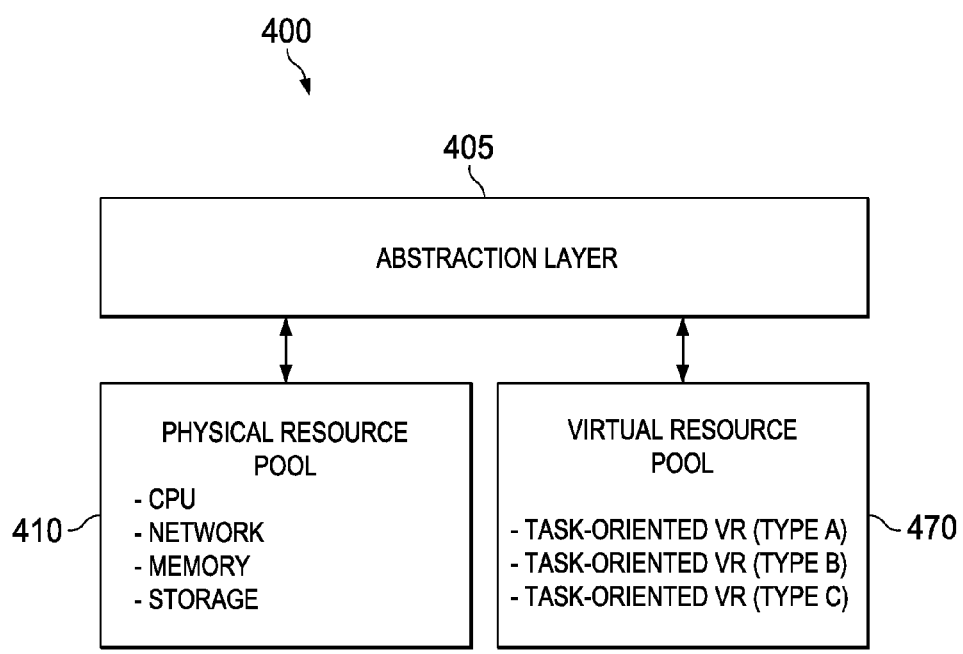
FIG. 4 illustrates a diagram of another embodiment virtualization environment.
Figure 5:
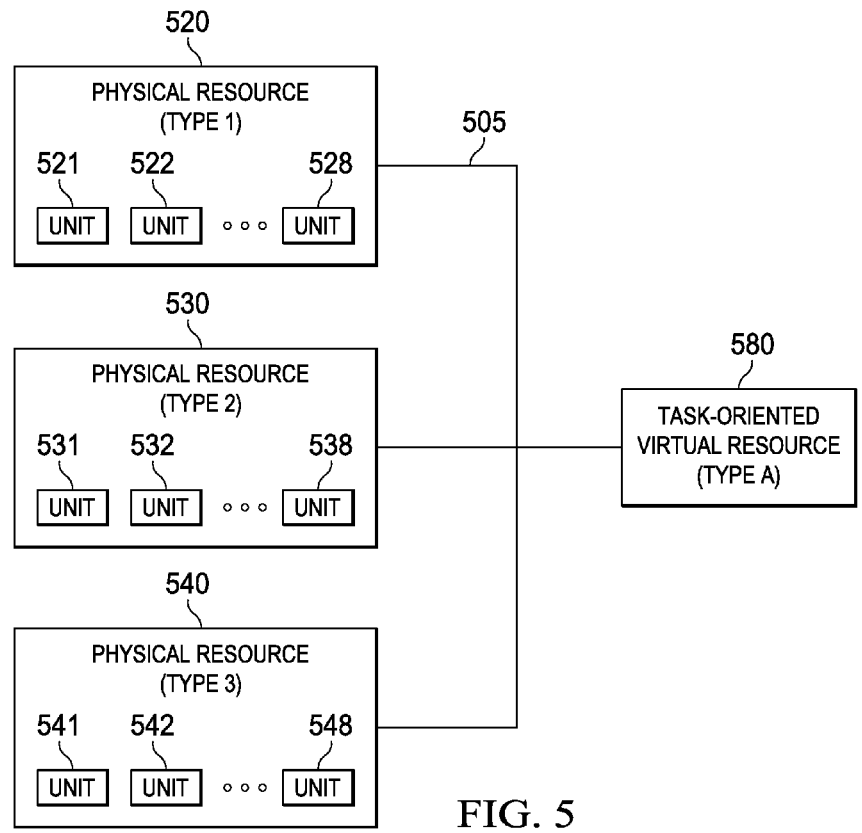
FIG. 5 illustrates a diagram of yet another embodiment virtualization environment.

An abstraction layer may be used to map task-oriented virtual resources in a virtual resource pool to physical resources in a physical resource pool. FIG. 4 illustrates an embodiment virtualization environment 400 in which an abstraction layer 405 is used to map task-oriented virtual resource types (e.g., type A, type B, type C, etc.) in a virtual resource pool 470 to physical resources (e.g., CPU, network, memory, storage, etc.) in a physical resource pool 410. In some embodiments, a task-oriented virtual resource can be mapped to different numbers of physical resource units for each physical resource type. FIG. 5 illustrates an embodiment virtualization environment 500 in which a task-oriented virtual resource 580 is mapped to multiple physical resource types 520, 530, 540 using an abstraction layer 505. In this example, task-oriented virtual resource 580 is mapped to physical resource units 521, 522, . . . 528 of physical resource type-1 520, to physical resource units 531, 532, . . . 538 of physical resource type-2 530, and physical resource units 541, 542, . . . 548 of physical resource type-3 540. The task-oriented virtual resource 580 may be mapped to different numbers of resource units for each of the physical resource types 520, 530, 540. Moreover, the number of physical resource units mapped to the task-oriented virtual resource 580 can be dynamically adjusted for each the physical resource types 520, 530, 540 independently.

Figure 6:
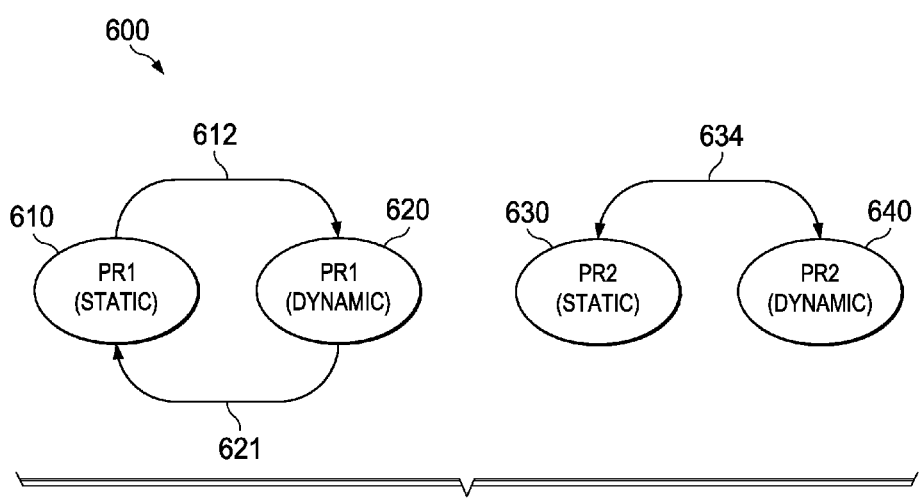
FIG. 6 illustrates a diagram of an embodiment finite state machine.

In some embodiments, mappings between physical and task-oriented virtual resources may be managed using a finite state machine. In some embodiments, the number of physical resource units mapped to the task-oriented virtual resource may be managed independently for each physical resource type. FIG. 6 illustrates a finite state machine 600 for managing mappings between a task-oriented virtual resource and two physical resources. The finite state machine includes a static node 610 and a dynamic node 620 for the first physical resource. When the finite state machine 600 operates in the static node 610, then the number of first-type physical resource units mapped to the task-oriented virtual resource remains constant. When the finite state machine 600 operates in the dynamic node 620, then the number of first-type physical resource units mapped to the task-oriented virtual resource is varied, e.g., increased or decreased. The finite state machine 600 migrates from the static node 610 to the dynamic node 620 based on a relationship 612, and the finite state machine 600 migrates from the dynamic node 620 to the static node 610 based on a relationship 621. The finite state machine further includes a static node 630 and a dynamic node 640 for the second physical resource. The number of second-type physical resource units that are mapped to the task-oriented virtual resource remains constant when the finite state machine 600 operates in the static node 630, and is varied when the finite state machine 600 operates in the dynamic node 640. The finite state machine 600 migrates from the static node 630 to the dynamic node 640 (and vice-versa) based on a bi-directional relationship 634. In some embodiments, the relationships 612, 621, and 634 include one or more conditions. Conditions may include workflow conditions associated with the underlying task, and the workflow conditions for each of the relationships 612, 621, and 634 may differ.

Figure 7:
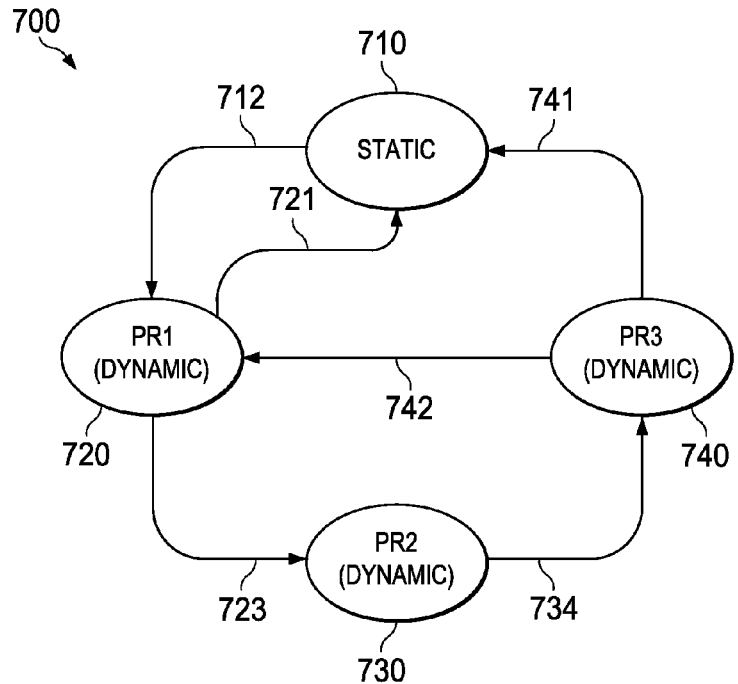
FIG. 7 illustrates a diagram of another embodiment finite state machine.

In some embodiments, the number of physical resource units mapped to a task-oriented virtual resource may be inter-dependent. FIG. 7 illustrates a finite state machine 700 for managing mappings between a task-oriented virtual resource and two physical resources. The finite state machine includes a static node 710 for all physical resources, and dynamic nodes 720, 730, 740 for first, second, and third physical resources (respectively). When the finite state machine 700 operates in the static node 710, then the number of physical resource units mapped to the task-oriented virtual resource is held constant for each physical resource type. Alternatively, when the finite state machine 700 operates in one of the dynamic nodes 720, 730, 740, then the number of physical resource units mapped to the task-oriented virtual resource is varied (e.g., increased or decreased) for the corresponding physical resource type. The finite state machine 700 migrates from the static node 710 to the dynamic node 720 based on a relationship 712, from the dynamic node 720 to the dynamic mode 730 based on a relationship 723, from the dynamic node 730 to the dynamic node 740 based on a relationship 734, and from the dynamic node 740 to the dynamic node 720 based on a relationship 742. Additionally, the finite state machine 700 can migrate from either of the dynamic nodes 720, 740 to the static node 710 based on the relationships 721, 741 (respectively). Each of the relationships 712, 721, 723, 734, 741, and 742 may include workflow conditions associated with the underlying task, and the workflow conditions for each of the relationships 712, 721, 723, 734, 741, and 742 may differ.

Figure 8:
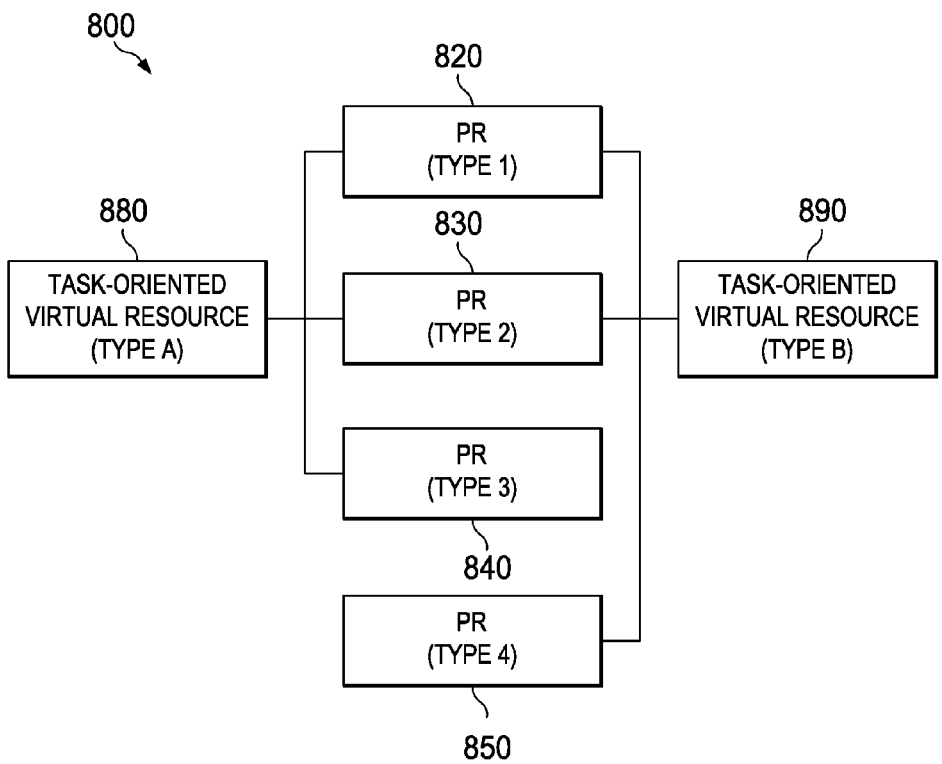
FIG. 8 illustrates a diagram of yet another embodiment virtualization environment.

In some embodiments, multiple task-oriented virtual resources can be mapped to the same physical resource. FIG. 8 illustrates an embodiment virtualization environment 800 in which task-oriented virtual resources 880, 890 are mapped to physical resources 820, 830, 840, 850. As shown, the task-oriented virtual resource 880 is mapped to physical resources 820, 830, and 840, while the task-oriented virtual resource 890 is mapped to physical resources 820, 830, and 850. Thus, the physical resources 820, 830 are mapped to both of the task-oriented virtual resources 880, 890.

In some embodiments, hybrid graphs may be used to model the relationships between nodes in the finite state machine. For example, hybrid graphs can be used to create, represent, and manage how workloads conditions define and/or affect relationships. Thus, hybrid graphs can be used as a tool for managing the mappings between task-oriented virtual resources and physical resources in a manner that permits dynamic resource allocation to efficiently and equitably satisfy changing workloads. Hybrid graphs may include nested, digraph, and undirected graph combinations to represent the relationships and the abstractions between workloads, task-oriented virtual resources, and physical resource components. Hybrid graphs may allow for relationships between each the task-oriented virtual resources and the corresponding physical resources to be separated from one another, thereby granting a separate life cycle to each resource type. By employing separate life cycles, task-oriented virtual resources can be managed independently from physical resources in both a temporal and spatial sense.

In some embodiments, hybrid graphs may be modeled in accordance with the following equation: G=N/E, where G represents the Graph and its context, N represents the composite workload and/or workload components, and E represents the relationships (e.g., constraints, logic between translation and application, and the allocation requirements to satisfy the necessary final relationships between the virtual and physical resources).

Hybrid graphs can include nodes and edges with representations applied to each depending on the location in the overall graph composite (level of the graph in view). Hybrid graphs may be nested within one another to allow higher granularity amongst the capabilities allocated to the relationships and without loss of granularity as abstraction is applied. Nodes in hybrid graphs may represent the workloads, virtual resources, physical resources and pools. The edges represent the functional relationships and/or logic between nodes, thereby establishing temporal and spatial relationships. The use of nested hybrid graphs for resource definition, resource allocation, and workload definitions allows for abstraction between the lower layer nested graphs and the upper layer parent graphs representing. The lower layer graphs may represent relationships between virtual resource pools and physical resource pools. The upper layer parent graphs may represent point in time services that are being provided to task-oriented virtual resources, as well as a mapping between workloads and task-oriented virtual resources. In some embodiments, a task-oriented virtual resource may be managed with a different lifecycle, a different semantic, and/or a different syntax than the corresponding physical resource counterparts.

Hybrid graphs may include 'edges' that link task-oriented virtual resources to physical resources. These edges may only need to be completed at the times of resource consumption and/or strict reservation. For example, consider a LAMP stack, which is a combined application having a 'Linux' operating system, an 'Apache' web service tier, a 'mySQL' database, and a 'PHP' application/scripting. The LAMP stack can be removed from a physical implementation and be virtualized for use in the 'Cloud'. Each of these components can exist on or in independent geographic regions, systems, or data centers, and under disparate management domains without loss of 'local' presence.

In a hierarchical sense, the utilization of some embodiment hybrid graphs may enable and/or provide the following scenario. A highest level of the hybrid graph representing the characterization of the cumulative workload, where the cumulative workload is a composite of multiple applications. The multiple applications may be geographically diverse with varying resource requirements. Nodes or vertices of the hybrid graphs may represent a component of the workload that is being virtualized. For example, the nodes may represent details specific to a LAMP stack. At the highest level, the graph may represent a cumulative workload consisting of four primary components. The 'Edges' of the graph may represent specific logic and relationship constraints between the nodes, e.g., preferred paths, time of day constraints, socket connections, database sizing and location, etc. The next level of graph represents the relationships between the individual nodes in the higher graph and their corresponding virtual resource services and requirements. In some embodiments, the edges of these graphs may present service level agreement (SLA) constraints, the virtual resource specific semantics and syntax for management, the preferential relationships between the Workload Nodes and the virtual resource Nodes. This structure allows the entire Workload to be managed with its virtual resource context and all associated SLA information independent of the base physical resources.

The next level hybrid graphs present the runtime or reservation time relationships between the virtual resources and their physical resource counterparts. Since there may not be an inextricable binding between resource types, the allocation units, performance metrics, and other management metrics, the syntax and semantic can be different with the edges of the graph providing the necessary logic for mapping. The use of this structured hybrid/nested graph composite breaks the constraints that force virtual and physical resources to be of the same type or definition. The mapping relationships using the edges and associated logic allows multiple physical resources from disparate geographic areas (storage across the globe say) to be represented as a local physical single unit to the virtual resource and/or SLA measurement mechanisms.

Figure 9:
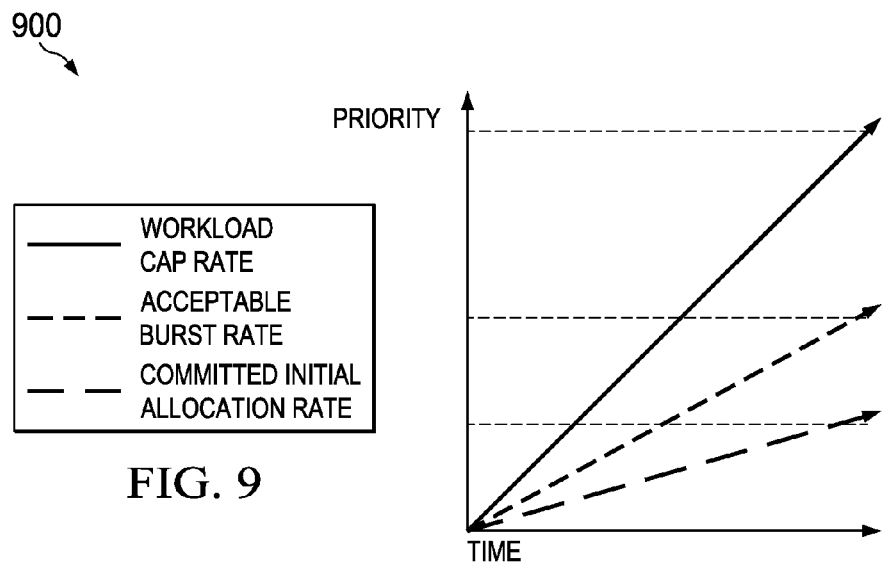
FIG. 9 illustrates a diagram of an embodiment hybrid graph.

Hybrid graphs may have various levels or tiers. FIG. 9 illustrates an embodiment high-level hybrid graph 900 showing the relationship between priority and time for a workload capacity rate, an acceptable burst rate, and a committed initial allocation rate. Hybrid graphs may allow for the nesting of any combination of directed or undirected graphs to represent the complex behavioral relationships between the nodes and edges. Each graph can represent one aspect of the total managed environment, and may partially or completely represent the behavior between listed nodes and resources. The use of hybrid graph(s) allow for any constraints to be represented as a relationship (e.g., constraint) between the nodes, resources and other components represented in the graphs. The mixed use of directed and undirected graphs may allow the abstraction layer to direct/manage resource allocation and/or behavior.

Figure 10:
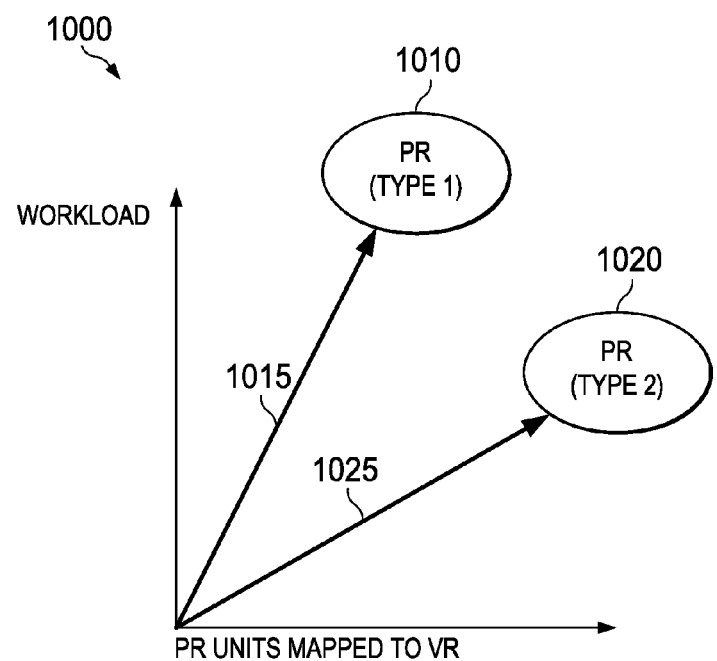
FIG. 10 illustrates a diagram of another embodiment hybrid graph.

In some embodiments, nodes of a hybrid graph can represent physical resources. FIG. 10 illustrates an embodiment hybrid graph 1000 comprising nodes 1010, 1020 that represent physical resource type-1 and physical resource type-2, respectively. As shown, the hybrid graph 1000 demonstrates relationships 1015, 1025 between a workload of the virtual resource and the nodes 1010, 1020, respectively. The relationships 1015, 1025 demonstrate how a number of physical resource units being mapped to the virtual resource varies based on the workload. Notably, the relationships 1015, 1025 have different slopes, which may be dynamically varied based on task based performance metrics. For instance, the slope associated with the relationship 1015 may be varied to improve a task based performance criteria or to optimize/improve a resource utilization metric.

Figure 11:
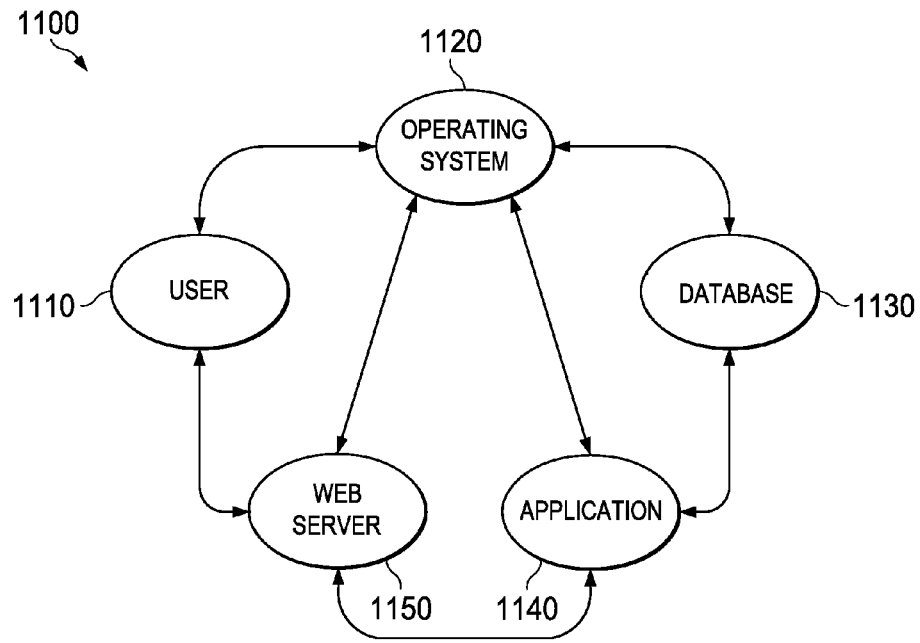
FIG. 11 illustrates a diagram of yet another embodiment hybrid graph.

In some embodiments, nodes of a hybrid graph may represent users, physical resources, devices responsible for providing physical resources, applications, or combinations thereof. FIG. 11 illustrates a hybrid graph 1100 comprising a plurality of nodes 1110-1150. As shown, the node 1110 represents a user, the node 1120 represents an operating system, node 1130 represents a database, node 1140 represents an application, and node 1150 represents a web-server. As shown, there are various bi-directional relationships between the nodes 1110-1150. Notably, the nodes 1110-1150 may be more than purely physical instantiations of the descriptions. Indeed, the nodes 1110-1150 may be semantically equivalent representations of those descriptions, and may include multiple physical and virtual resources of varying types. Thus, the descriptions of FIG. 11 and the nodes 1110-1150 are included for semantic equivalence and are intended to show the flexibility of management control provided by the graph over any composite or singular resource/node.

Figure 12:
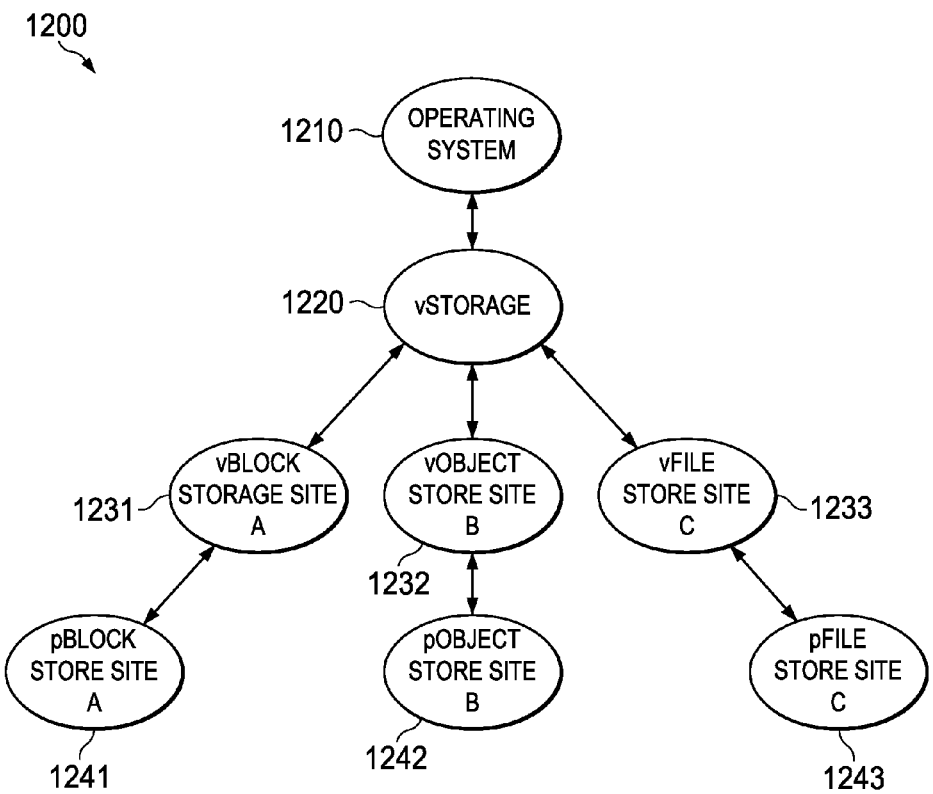
FIG. 12 illustrates a diagram of yet another embodiment hybrid graph.

In some embodiments, nodes in a hybrid graph may have a hierarchical relationship. FIG. 12 illustrates a hybrid graph 1200 comprising a plurality of nodes 1210-1243 having a hierarchical relationship. As shown, the node 1210 represents an operating system, node 1220 represents a storage resource, nodes 1231, 1232, 1233 represent different virtual object storage sites, and nodes 1241, 1242, and 1243 represent different physical block storage sites. As shown, complex relationships that can be represented by the nodes 1210-1243, as demonstrated by tracing the management path to the ultimate physical resource(s) represented as leafs in the graph. The root of the graph provides the abstraction level node at which all SLAs and management processes can be leveraged, using the graph and following the nested relationships provides a drill down effect allowing for true end-to-end Fault, Configuration, Accounting, Performance, Security (FCAPS) and create, update, and delete (CRUD) capabilities if need be. Given the dynamic relationship of virtual and physical resource mapping the management requirements can terminate at the higher layer/level nodes and satisfy SLA use with metrics from that higher level relationship or the SLA metrics can be traced to the dynamic sets of resources (both p and v) used throughout the lifecycle of the relationship.

Figure 13:
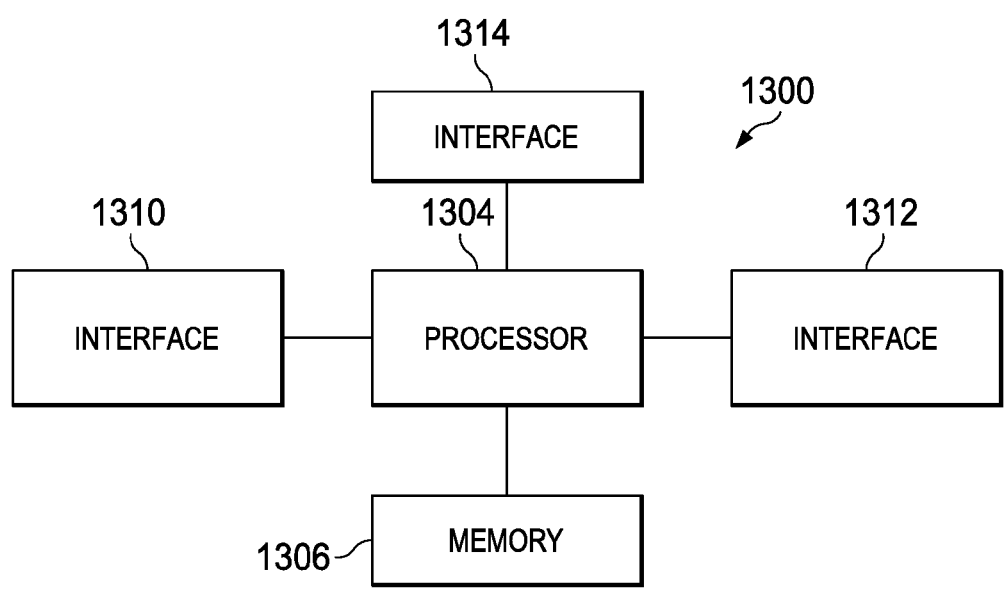
FIG. 13 illustrates a block diagram of an embodiment communications device.

FIG. 13 illustrates a block diagram of an embodiment of a processing device 1300, which may be configured to perform tasks in an embodiment virtualized network. The processing device 1300 may include a processor 1304, a memory 1306, and a plurality of interfaces 1310, 1312, 1314, which may (or may not) be arranged as shown in FIG. 13. The processor 1304 may be any component capable of performing computations and/or other processing related tasks, and the memory 1306 may be any component capable of storing programming and/or instructions for the processor 1304. The interfaces 1310, 1312, and 1314 may be any component or collection of components that allows the processing device 1300 to communicate with other network devices.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

I claim:

1. A method for sharing resources in a network, the method comprising:
   creating, by an abstraction layer, a single virtual resource corresponding to a task to be performed by the network on behalf of a customer;
   mapping, by a network device, the single virtual resource to two or more different types of physical resources, in a resource pool, required to perform the task, the single virtual resource being mapped to a respective number of physical resource units for each of the different types of physical resources;
   detecting a variation in a workload associated with the task; and
   dynamically updating numbers of physical resource units for the different types of physical resources mapped to the single virtual resource in accordance with the variation in the workload associated with the task.

2. The method of claim 1, wherein the single virtual resource is defined by the task to be performed by the network on behalf of the customer.

3. The method of claim 1, wherein physical resources in the resource pool are classified as having one of a plurality of resource types, the plurality of resource types including at least a processing resource type and a memory resource type, and wherein the single virtual resource comprises a task-oriented resource type that is excluded from the plurality of resource types used to classify physical resources in the resource pool.

4. The method of claim 1, wherein mapping the single virtual resource to multiple physical resources in the resource pool of the network comprises:
   mapping the single virtual resource to a number of physical processing resource units and a number of physical memory resource units in accordance with an initial value of the workload associated with the task.

5. The method of claim 4, wherein the number of physical processing resource units mapped to the single virtual resource is different than the number of physical memory resource units mapped to the single virtual resource.

6. The method of claim 4, wherein dynamically updating the number of physical resource units mapped to the single virtual resource in accordance with the variation in the workload associated with the task comprises:
   dynamically updating the number of physical processing resource units mapped to the single virtual resource or the number of physical memory resource units mapped to the single virtual resource in accordance with the variation in the workload associated with the task.

7. The method of claim 1, wherein mapping the single virtual resource to multiple physical resources in the resource pool comprises:
   mapping the single virtual resource to physical resources in accordance with a hybrid graph, the hybrid graph modeling relationships between workloads associated with the task, the single virtual resource, and the multiple physical resources.

8. The method of claim 1, further comprising creating a finite state machine for managing the single virtual resource.

9. A method for sharing resources in a network, the method comprising:
   creating, by an abstraction layer, a single virtual resource, the single virtual resource corresponding to a task to be performed by the network on behalf of a customer;
   mapping, by a network device, the single virtual resource to multiple physical resources in a resource pool of the network; and
   creating a finite state machine for managing the single virtual resource, wherein creating the finite state machine for managing the single virtual resource comprises:
      identifying, by the abstraction layer, a physical resource type classifying a number of physical resource units being mapped to the single virtual resource;
      creating, by the abstraction layer, a static state and a dynamic state for the physical resource type, wherein the number of physical resource units being mapped to the single virtual resource is held constant when the finite state machine operates in the static state, and wherein the number of physical resource units being mapped to the single virtual resource is varied when the finite state machine operates in the dynamic state; and
      creating, by the abstraction layer, a relationship between the static state and the dynamic state in accordance with a workload assigned to the task.

10. The method of claim 9, wherein the relationship defines a triggering condition for migrating the finite state machine from the static state to the dynamic state or vice versa.

11. The method of claim 10, further comprising:
- identifying, by the abstraction layer, a first physical resource type classifying a first type of physical resource units being mapped to the single virtual resource;
- identifying, by the abstraction layer, a second physical resource type classifying a second type of physical resource units being mapped to the single virtual resource;
- creating, by the abstraction layer, a first dynamic state for the first physical resource type, wherein a number of first type physical resource units being mapped to the single virtual resource is varied when the finite state machine operates in the first dynamic state;
- creating, by the abstraction layer, a second dynamic state for the second physical resource type, wherein a number of second type physical resource units being mapped to the single virtual resource is varied when the finite state machine operates in the second dynamic state; and
- creating, by the abstraction layer, a relationship between the first dynamic state and the second dynamic state in accordance with a workload parameter of the task associated with the single virtual resource.

12. The method of claim 11, wherein the relationship defines a triggering condition for migrating the finite state machine from the first dynamic state to the second dynamic state.

13. A non-transitory computer program product comprising a computer readable storage medium storing programming, the programming including instructions to:
- create a single virtual resource corresponding to a task to be performed by a network on behalf of a customer;
- map the single virtual resource to two or more different types of physical resources, in a resource pool, required to perform the task, the single virtual resource being mapped to a respective number of physical resource units for each of the different types of physical resources;
- detect a variation in a workload associated with the task; and
- dynamically update numbers of physical resource units for the different types of physical resources mapped to the single virtual resource in accordance with the variation in the workload associated with the task.

14. The non-transitory computer program product of claim 13, wherein the instructions to map the single virtual resource to multiple physical resources in the resource pool includes instructions to:
- map the single virtual resource to physical resources in accordance with a hybrid graph, the hybrid graph modeling relationships between workloads assigned to the task, the single virtual resource, and the multiple physical resources.

15. The non-transitory computer program product of claim 13, wherein physical resources in the resource pool are classified as having one of a plurality of resource types, the plurality of resource types including at least a processing resource type and a memory resource type, and wherein the single virtual resource comprises a task-oriented resource type that is excluded from the plurality of resource types used to classify physical resources in the resource pool.

16. A non-transitory computer program product comprising a computer readable storage medium storing programming, the programming including instructions to:
- create a single virtual resource corresponding to a task to be performed by a network on behalf of a customer;
- map the single virtual resource to multiple physical resources in a resource pool of the network; and
- create a finite state machine for managing the single virtual resource, the instructions to create the finite state machine including instructions to:
  - identify a physical resource type classifying a number of physical resource units being mapped to the single virtual resource;
  - create a static state and a dynamic state for the physical resource type, wherein the number of physical resource units being mapped to the single virtual resource is held constant when the finite state machine operates in the static state, and wherein the number of physical resource units being mapped to the single virtual resource is varied when the finite state machine operates in the dynamic state; and
  - create a relationship between the static state and the dynamic state in accordance with a workload assigned to the task.

17. The non-transitory computer program product of claim 16, wherein the relationship defines a triggering condition for migrating the finite state machine from the static state to the dynamic state or vice versa.

18. The non-transitory computer program product of claim 13, wherein the single virtual resource is defined by the task to be performed by the network on behalf of the customer.

19. The non-transitory computer program product of claim 13, wherein the instructions to map the single virtual resource to multiple physical resources in the resource pool of the network includes instructions to:
- map the single virtual resource to a number of physical processing resource units and a number of physical memory resource units in accordance with an initial value of the workload associated with the task.

20. The non-transitory computer program product of claim 13, wherein the instructions to dynamically update the number of physical resource units mapped to the single virtual resource in accordance with the variation in the workload associated with the task include instructions to:
- dynamically update a number of physical processing resource units mapped to the single virtual resource or a number of physical memory resource units mapped to the single virtual resource in accordance with the variation in the workload associated with the task.

* * * * *